April 23, 1957 R. W. HUDSON 2,789,861
GLOVE COMPARTMENT DOOR SERVICE TRAY FOR VEHICLES
Filed April 20, 1954 3 Sheets-Sheet 1

INVENTOR
RANDOLPH W. HUDSON
BY
ATTORNEY

April 23, 1957 R. W. HUDSON 2,789,861
GLOVE COMPARTMENT DOOR SERVICE TRAY FOR VEHICLES
Filed April 20, 1954 3 Sheets-Sheet 2
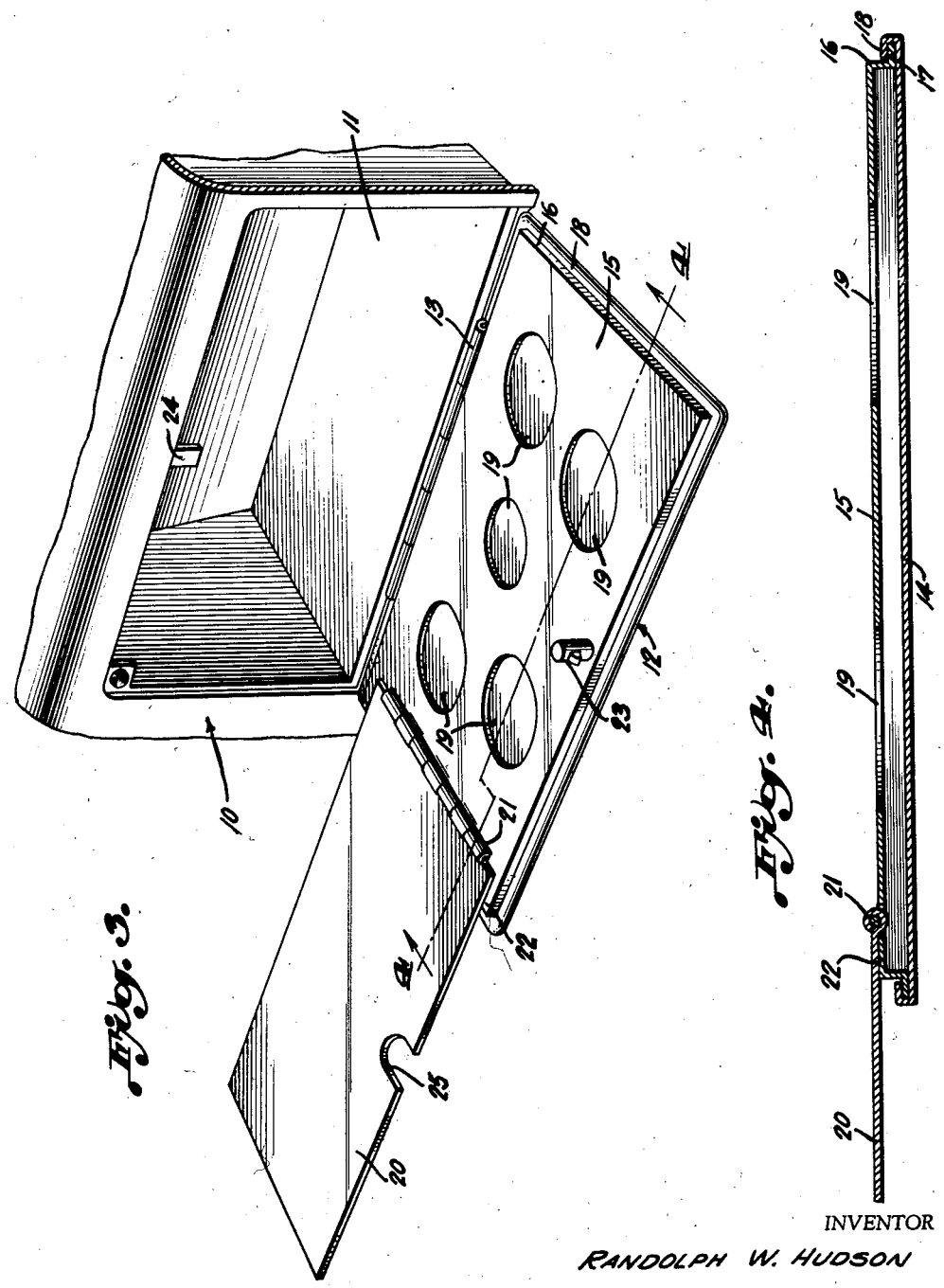
INVENTOR
RANDOLPH W. HUDSON
BY
ATTORNEY April 23, 1957 R. W. HUDSON 2,789,861
GLOVE COMPARTMENT DOOR SERVICE TRAY FOR VEHICLES
Filed April 20, 1954 3 Sheets-Sheet 3
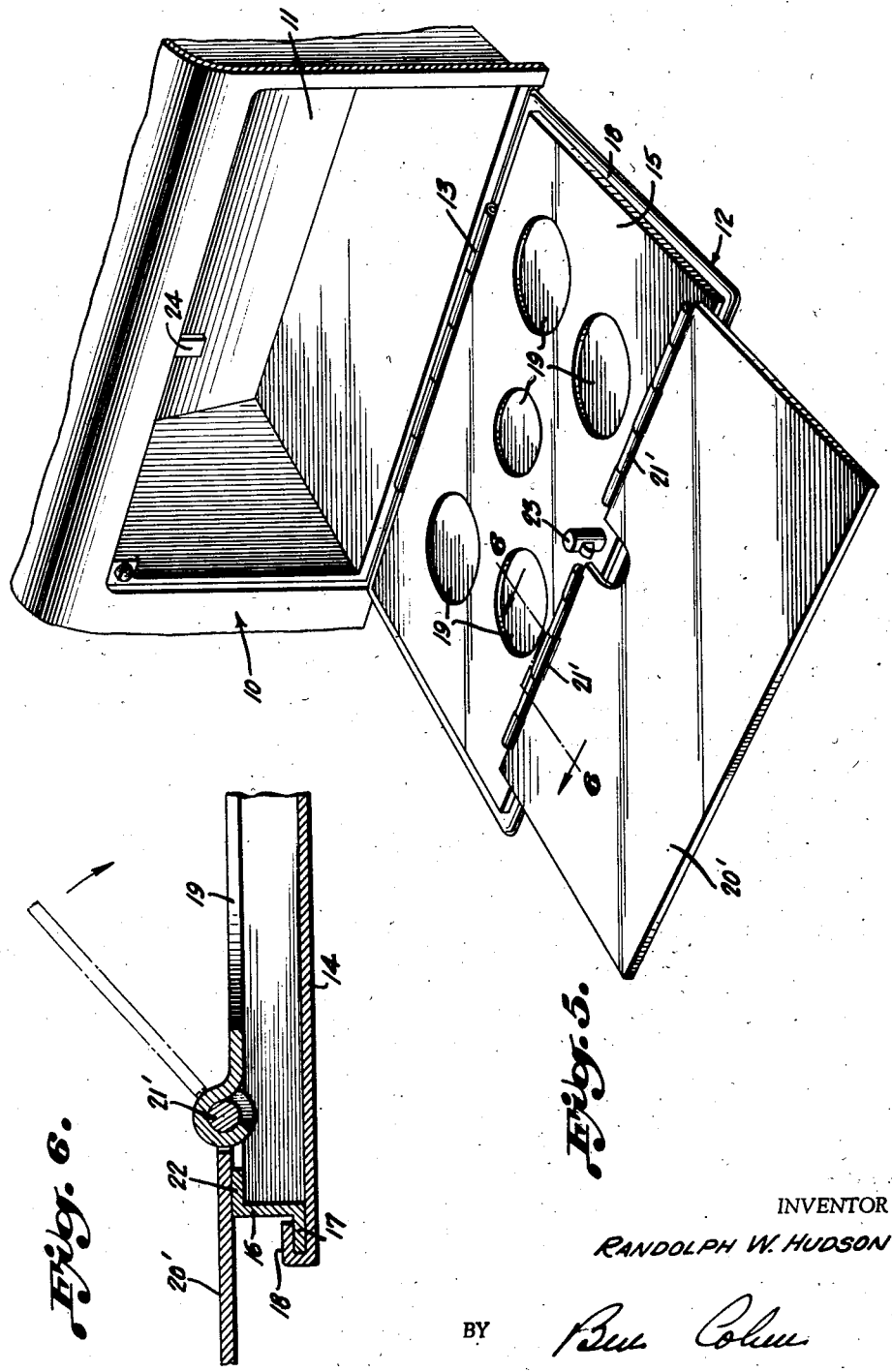
INVENTOR
RANDOLPH W. HUDSON
BY
ATTORNEY

United States Patent Office 2,789,861
Patented Apr. 23, 1957

2,789,861

GLOVE COMPARTMENT DOOR SERVICE TRAY FOR VEHICLES

Randolph W. Hudson, Lynchburg, Va.

Application April 20, 1954, Serial No. 424,321

1 Claim. (Cl. 296—37)

This invention relates to a serving tray designed for use in connection with motor vehicles, to support refreshments such as are served at roadside stands.

Heretofore, there have been provided service trays which were temporarily attached to a vehicle in various ways, usually to the door of the vehicle, such trays being furnished by the owner of the roadside stand. This type of tray has proven objectionable as often being necessarily attachable at inconvenient heights or locations, and as requiring to be attached and removed at each time of use. A further objection to this type of tray from the viewpoint of the owner is the fact that many automobiles drove away, with the tray, resulting in a loss to the owner.

Another attempt to solve the problem of providing a tray for supporting refreshments has been to design a tray adapted to be secured to the underside of an instrument panel or dash board, such tray being retractible under the dash board when not in use. This type of tray is objectionable as being either too expensive to manufacture or too inconvenient to install or operate.

Attempts have also been made to provide a collapsible type of tray which may be stored within the conventional glove compartment in the dash board of a vehicle. This also has its drawbacks in that it is necessary to modify the existing compartment or dash board to mount the tray supporting structure.

The primary object of the present invention is to provide a serving tray forming an integral part of the door closing the usual glove compartment of a motor vehicle. The door with its tray structure is installed at the factory when the car is new and becomes an important accessory of the original car. It is also within the realm of the present invention to provide the conventional glove compartment door with a built-in tray, which door can replace the door found in existing vehicles.

Another object of the present invention is to provide a glove compartment door, the rear face of which is constructed to provide a supporting surface for supporting glasses and dishes containing foods while the foods are being consumed.

Still another object of the invention is to provide the aforesaid rear face of the glove compartment door with an extensible tray portion adapted to cooperate with the rear face of the door to provide an enlarged supporting surface.

A still further object of the invention is to provide an extensible tray for the glove compartment door of a vehicle which will present a strong and durable support and which when not in use is housed within the glove compartment without interfering with other objects housed within the compartment.

These and other objects and advantages of the present invention will be manifest from the following description taken in conjunction with the accompanying drawings wherein:

Figure 3 is a similar view with the extensible portion of the tray in open position.

Figure 4 is a sectional view taken on the line 4—4 of Figure 3.

Figure 5 is a view similar to Figure 3 but showing a slightly modified form of construction, and Figure 6 is a sectional view taken on the line 6—6 of Figure 5.

Figure 1:
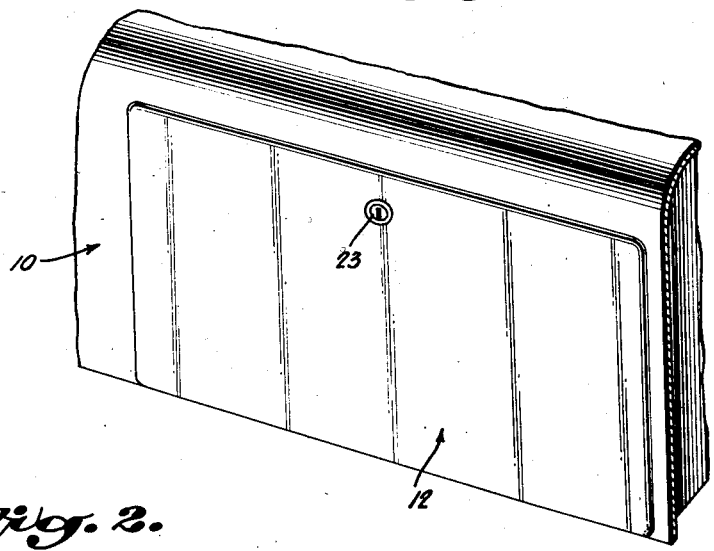
Figure 1 is a perspective view of a portion of the dash board of a vehicle showing the outlines of the glove compartment with the door closed.

Referring to the drawings in detail, the reference numeral 10 is used to indicate any conventional vehicle dash board, numeral 11 indicating the usual glove compartment and numeral 12 denoting the glove compartment door.

The usual glove compartment door is hinged to the dash board to open downwardly and in the past any type of hinge sufficed with no provision made for supporting the door in a truly horizontal position. In the present case any type of hinge may be used as long as the door, when in open position, is supported in truly horizontal position. For illustrative purposes, a piano type of hinge is shown and this hinge is designated by numeral 13.

As seen in Figure 4, the door comprises an outer wall 14 suitably decorated to blend with the rest of the dash board and an inner wall 15. The inner wall is formed of metal or the like and has a surrounding edge wall 16 terminating in an outwardly extending flange 17. The outwardly extending flange 17 cooperates with the inturned flange 18 of the outer wall to lock the inner wall in place. The edge wall 16 is made of sufficient depth to space the inner wall 15 from the outer wall 14 for a purpose which will appear as the description progresses.

As seen in Figure 3, openings 19 are provided in the inner wall 15 to receive glasses, cups, bottles, plates or the like to prevent shifting of these various articles. The space between the walls 14 and 15 is made sufficiently deep to receive the lower ends of the articles listed above.

In order to provide additional supporting surfaces for the various articles previously mentioned, there is provided a tray panel in the form of a rigid member 20 hinged to one side of the inner wall 15 by means of a hinge member 21. As seen in Figures 3 and 4, the hinge is spaced inwardly from the side edge of the wall 15 whereby a portion of this wall indicated by numeral 22 serves to act as a support for the member 20 when in open position.

It is usual to provide the glove compartment door with a lock which cooperates with a latch mounted adjacent the top edge of the glove compartment opening. The lock is denoted by numeral 23 and the latch by numeral 24. To accommodate this lock, the member 20 is provided with a notched-out portion 25.

Figure 2:
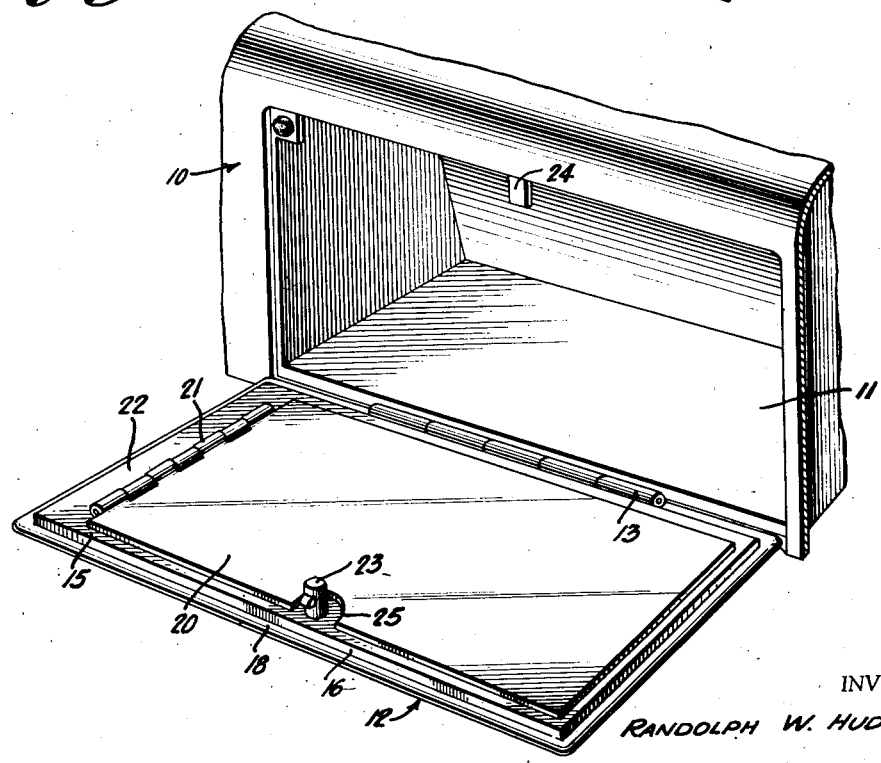
Figure 2 is a similar view of the door in open position with the extensible portion of the tray in closed position.

In the modification shown in Figures 5 and 6, the structural details of the various parts are the same as the various parts shown in Figures 1 to 4 inclusive except for the location of the extensible member 20' and the hinge 21'. All other parts being the same, they have been designated by similar reference numerals. In this form of the invention, the member 20' hinges outwardly toward the occupant of the vehicle.

The manner of use of the tray device described above is apparent. It will be seen that the member 20 closes against the inner wall 15 of the door and when the door is closed, the member 20 will not interfere with objects contained within the glove compartment and thus storage space within the compartment will not be sacrificed. It will be apparent that numerous changes may be made in the details of construction without departing from the essential concept which is to provide a glove compartment door in the form of a supporting surface for refreshments while the refreshments are being consumed. Thus, I do not wish to be limited by the details of construction shown except as required by the scope of the following claim.

Having thus described the invention, what is claimed is:

A tray for serving refreshments comprising a door for the glove compartment of a vehicle, said door being hinged to the glove compartment to swing downwardly into a horizontal plane, said door comprising inner and outer walls secured together and spaced from each other to define a space therebetween, said inner wall having a substantially flat outer surface and having openings formed therein to support articles against lateral shifting, and an extensible supporting member hinged to said inner wall adjacent an edge thereof and inwardly of said edge, said member adapted to unfold to an open position to increase the supporting surface of the tray, said supporting member being substantially flat and lying against the flat inner surface of the inner wall when in folded position.

References Cited in the file of this patent

UNITED STATES PATENTS

| | | |
|---|---|---|
| 2,014,745 | Regli | Sept. 17, 1935 |
| 2,111,434 | Morrison | Mar. 15, 1938 |
| 2,382,011 | Howard | Aug. 14, 1945 |
| 2,554,685 | St. Denis | May 29, 1951 |